US012638998B2

(12) United States Patent
He et al.

(10) Patent No.: US 12,638,998 B2
(45) Date of Patent: May 26, 2026

(54) DATA TRANSFER DURING MAINTENANCE OPERATIONS

(71) Applicant: Micron Technology, Inc., Boise, ID (US)

(72) Inventors: Deping He, Boise, ID (US); Nadav Grosz, Broomfield, CO (US)

(73) Assignee: Micron Technology, Inc., Bosie, ID (US)

( * ) Notice: Subject to any disclaimer, the term of this patent is extended or adjusted under 35 U.S.C. 154(b) by 0 days.

(21) Appl. No.: 18/776,201

(22) Filed: Jul. 17, 2024

(65) Prior Publication Data

US 2025/0117150 A1 Apr. 10, 2025

Related U.S. Application Data

(60) Provisional application No. 63/588,978, filed on Oct. 9, 2023.

(51) Int. Cl.
G06F 3/06 (2006.01)
(52) U.S. Cl.
CPC .......... G06F 3/0647 (2013.01); G06F 3/0619 (2013.01); G06F 3/0659 (2013.01); G06F 3/0679 (2013.01)
(58) Field of Classification Search
CPC ..... G06F 3/0679; G06F 3/0659; G06F 3/0647
See application file for complete search history.

(56) References Cited

U.S. PATENT DOCUMENTS

| | | | | |
|---|---|---|---|---|
| 12,332,778 | B2 * | 6/2025 | Jang .................... | G06F 12/0246 |
| 2010/0325351 | A1 * | 12/2010 | Bennett ............... | G06F 12/0246 |
| | | | | 711/170 |
| 2012/0179860 | A1 * | 7/2012 | Falanga ............... | G11C 16/102 |
| | | | | 711/155 |
| 2019/0310795 | A1 * | 10/2019 | Mathada ................ | G11C 16/26 |
| 2021/0142855 | A1 * | 5/2021 | Na ........................ | G11C 7/1084 |
| 2021/0216239 | A1 * | 7/2021 | Dutta .................... | G06F 3/0658 |
| 2022/0083280 | A1 * | 3/2022 | Su ........................... | G06F 12/10 |
| 2025/0028473 | A1 * | 1/2025 | Athreya ................ | G06F 3/0604 |

* cited by examiner

*Primary Examiner* — Edward J Dudek, Jr.
(74) *Attorney, Agent, or Firm* — Holland & Hart LLP

(57) ABSTRACT

Methods, systems, and devices for data transfer during maintenance operations are described. A memory system utilize an auto-suspend feature to parallelize aspects of maintenance operations. For example, the memory system may suspend a programming operation being performed on a first block of memory cells. The memory system may read data from a second block of memory cells while the programming operation is suspended, and may transfer the data from the second block of memory cells (e.g., to a controller) in parallel with resuming the programming operation on the first block of memory cells. The memory system may transfer the data read from the second block of memory cells to a third block of memory cells in parallel with resuming the programming operation on the first block of memory cells.

20 Claims, 5 Drawing Sheets

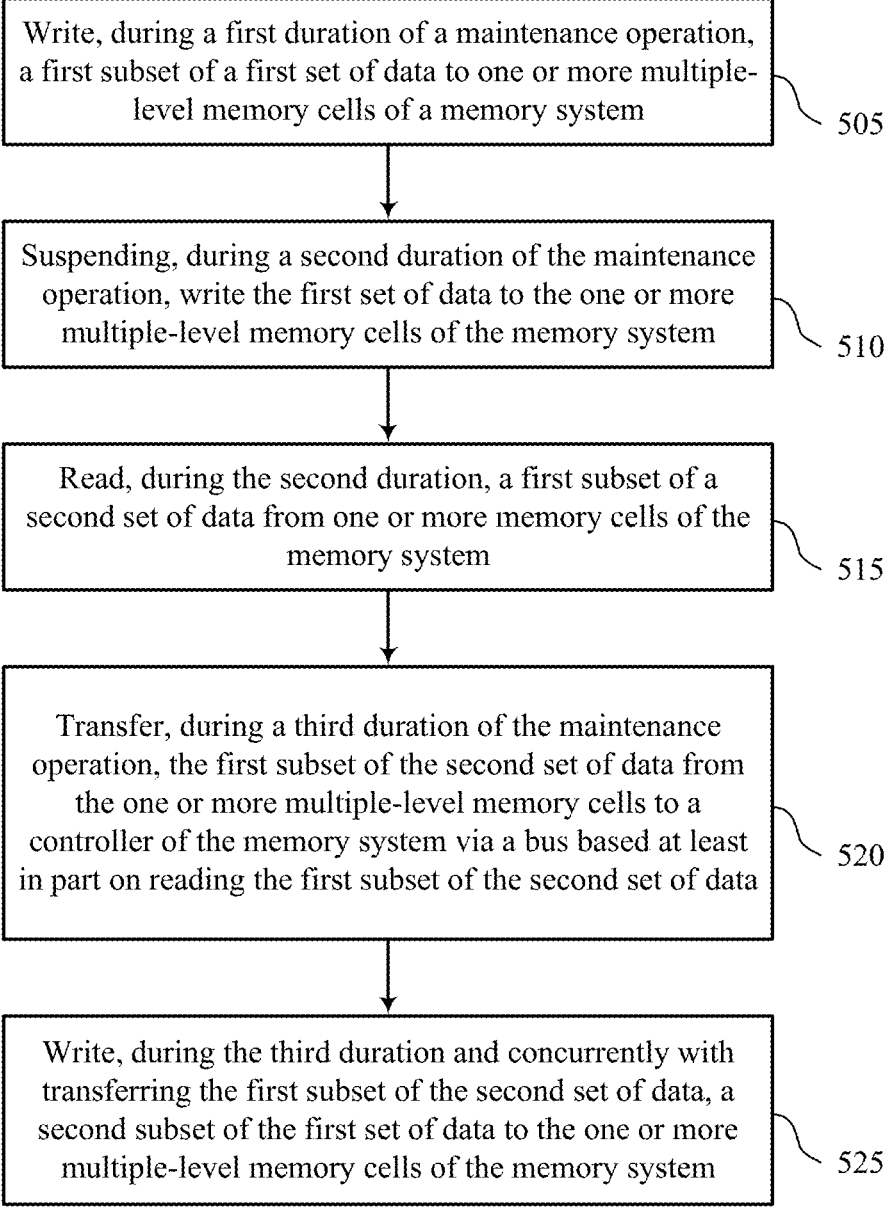

Write, during a first duration of a maintenance operation, a first subset of a first set of data to one or more multiple-level memory cells of a memory system

505

Suspending, during a second duration of the maintenance operation, write the first set of data to the one or more multiple-level memory cells of the memory system

510

Read, during the second duration, a first subset of a second set of data from one or more memory cells of the memory system

515

Transfer, during a third duration of the maintenance operation, the first subset of the second set of data from the one or more multiple-level memory cells to a controller of the memory system via a bus based at least in part on reading the first subset of the second set of data

520

Write, during the third duration and concurrently with transferring the first subset of the second set of data, a second subset of the first set of data to the one or more multiple-level memory cells of the memory system

DATA TRANSFER DURING MAINTENANCE OPERATIONS

CROSS REFERENCE

The present Application for Patent claims priority to U.S. Patent Application No. 63/588,978 by He et al., entitled "DATA TRANSFER DURING MAINTENANCE OPERATIONS," filed Oct. 9, 2023, which is assigned to the assignee hereof, and which is expressly incorporated by reference in its entirety herein.

TECHNICAL FIELD

The following relates to one or more systems for memory, including data transfer during maintenance operations.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIG. 5 shows a flowchart illustrating a method or methods that support data transfer during maintenance operations in accordance with examples as disclosed herein.

DETAILED DESCRIPTION

Figure 1:
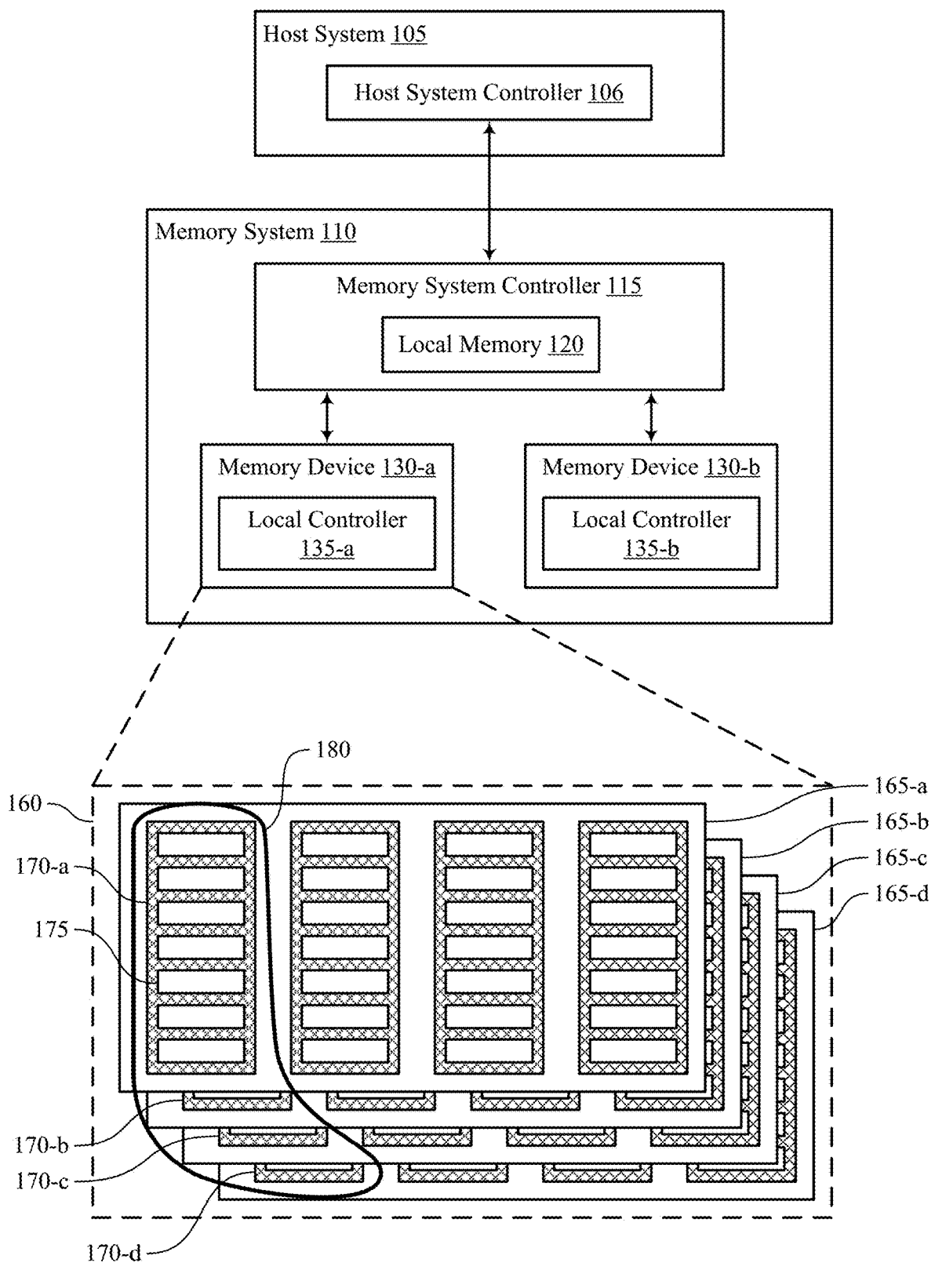
FIG. 1 shows an example of a system that supports data transfer during maintenance operations in accordance with examples as disclosed herein.

A memory system may include a memory device (e.g., a NAND memory device), a memory controller, and a bus (e.g., an Open NAND Flash Interface (ONFI) bus) coupled with the memory device and memory controller. In some cases, during maintenance operations (e.g., garbage collection operations), data may be read from a block of memory cells of the memory device and may be transferred to the memory controller via the bus. The memory controller may receive the data and transfer (e.g., program) the data to a different block of memory cells using the bus. However, in such examples, the data may be read to the controller and programmed to a block of memory cells during non-overlapping durations (e.g., the operations may be performed serially). Performing the operations serially may add undesirable latency to maintenance operations, which may affect the overall performance of the memory system. Accordingly, a memory system configured to perform aspects of maintenance operations in parallel may be desirable.

A memory system configured to perform aspects of maintenance operations in parallel is described herein. For example, the memory system described herein may transfer data from a memory controller to a first block of memory cells (e.g., block N) via a bus, and may begin programming the data (e.g., during a maintenance operation). In some examples, the memory system may suspend programming the data and may read data from a second block of memory cells (e.g., block N+1) to the memory controller via the bus. After reading the data from the second block, the memory system may resume programming the data to the first block and may transfer the data from the memory controller to the second block while programming the first block. Thus, when the first block is programmed, the memory system may begin programming the second block of memory cells. By performing such operations in parallel, the memory system may mitigate latency that would otherwise be incurred due to performing the operations serially. Thus, the overall performance of the memory system may be improved.

In addition to applicability in memory systems as described herein, techniques for performing data transfers during maintenance operations may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by allowing maintenance operations (e.g., garbage collection programs) to occur, and reducing overall time costs, which may decrease processing or latency times, improve response times, or otherwise improve overall performance, among other benefits.

In addition to applicability in memory systems as described herein, techniques for performing data transfers during maintenance operations may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory devices capable of effectively and efficiently storing relatively large quantities of data or accessing stored data relatively quickly. Implementing the techniques described herein may improve the performance of electronic devices by allowing maintenance operations (e.g., garbage collection programs) to occur, and reducing overall time costs, which may decrease processing or latency times, improve response times, or otherwise improve overall performance, among other benefits.

Features of the disclosure are initially described in the context of systems, devices, and circuits with reference to FIG. 1. Features of the disclosure are described in the context of timing diagrams and process flow with reference to FIGS. 2A, 2B, and 3. These and other features of the disclosure are further illustrated by and described in the context of an apparatus diagram and flowchart that relate to data transfer during maintenance operations with reference to FIGS. 4 and 5.

FIG. 1 shows an example of a system 100 that supports data transfer during maintenance operations in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support data transfer during maintenance operations. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 described herein may transfer data from the memory system controller 115 to a first block 170-a (e.g., block N) via a bus, and may begin programming the data (e.g., during a maintenance operation). In some examples, the memory system controller 115 may suspend programming the data and may read data from a second block 170-b via the bus. After reading the data from the second block, the memory system controller 115 may resume programming the data to the first block and may transfer the data to a third block 170-c (e.g., block N+1) while programming the first block 170-a. Thus, if the first block 170-a is programmed, the memory system controller 115 may begin programming the third block 170-c. By performing such operations in parallel, the memory system 110 may mitigate undesirable latency that would otherwise be incurred due to performing the operations serially. Thus, the overall performance of the memory system 110 may be improved.

Figures 2A, 2B:
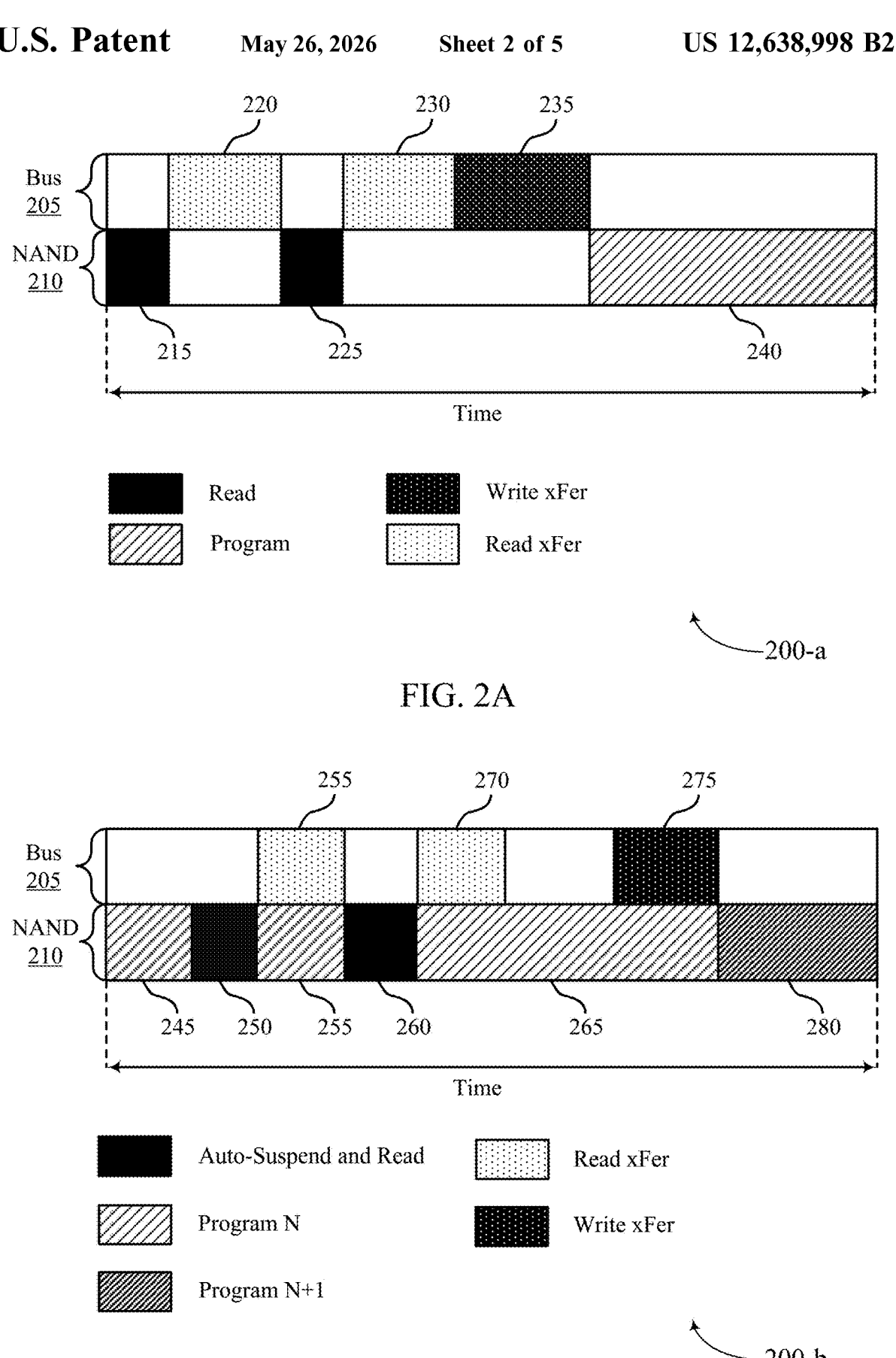
FIG. 2A shows an example of a timing diagram that supports consecutive data transfers and maintenance operations in accordance with examples as disclosed herein.
FIG. 2B shows an example of a timing diagram that supports data transfer during maintenance operations in accordance with examples as disclosed herein.

FIG. 2A shows an example of a timing diagram 200-a that supports data transfers during maintenance operations in contrast with examples as disclosed herein. The timing diagram 200-a may be illustrate aspects performed by a system 100 as described with reference to FIG. 1. For example, the memory system 110 may illustrate data transfers via a bus 205 (e.g., an ONFI bus) and may illustrate programming operations at one or more NAND devices 210. In some instances, the bus 205 may be coupled with the NAND devices 210 and a controller (e.g., a memory system controller 115 as described with reference to FIG. 1). Aspects of the conventional methods described with reference to FIG. 2A may be performed serially, which may add undesirable latency to maintenance operations performed by the memory system, which may affect its overall performance.

In some cases, conventional systems or methods for data transfers during maintenance operations may be limited to serial (e.g., non-overlapping) operations, and a memory system may not be able to transfer data for a next consecutive program (e.g., N+1) while also performing the programming for a current program (e.g., N). For example, as shown by timing diagram 200-a, a first portion of data may be read from a block of memory cells of the NAND device 210 during a first duration 215. During a second duration 220, the first portion of the data may be transferred (e.g., Read xFer) to the memory system controller via the bus 205. In some examples, a second portion of data may be read from the block of memory cells of the NAND device 210 during a third duration 225 and the second portion of the data may be transferred to the memory system controller via the bus 205 during a fourth duration 230.

During a fifth duration 235, the memory system controller may transfer (e.g., Write xFer) the data read from the block of memory cells to a second block of memory cells of the NAND device 210 via the bus 205. During a sixth duration 240, the data may be programmed to the second block of memory cells of the NAND device 210. Accordingly, as shown in FIG. 2A, the memory system may perform aspects of a maintenance operation for a block of memory cells (e.g., block N) serially. That is, the data may be read from the NAND device, transferred to the memory system controller via the bus 205, and written (e.g., programmed) to the NAND device 210 during serial operations. Similar processes may occur in response to performing maintenance operations on additional blocks (e.g., block N+1, block N+2, etc.).

Due to the serialization of the aspects of each maintenance operation, the time used for each maintenance operation may include relatively large durations allocated to transferring data via the bus 205 (e.g., Read xFers, Write xFers). For example, in response to performing a maintenance operation on a TLC block, the bus 205 transfers may be as much as half of the total duration of the maintenance operation. Additionally, as illustrated by the timing diagram 200-a, the memory system may perform a subsequent maintenance operation (e.g., for block N+1) after a current maintenance operation (e.g., for block N) is complete. Performing the operations serially may add latency to the maintenance operations, which may affect the memory system's overall performance. Accordingly a memory system configured to perform aspects of maintenance operations in parallel may be desirable.

FIG. 2B shows an example of a timing diagram 200-b that supports data transfer during maintenance operations in accordance with examples as disclosed herein. The timing diagram 200-b may illustrate aspects performed by a system 100 as described with reference to FIG. 1. For example, the memory system 110 may illustrate data transfers via a bus 205 (e.g., an ONFI bus) and may illustrate programming operations at one or more NAND devices 210. In some instances, the bus 205 may be coupled with the NAND devices 210 and a controller (e.g., a memory system controller 115 as described with reference to FIG. 1). The timing diagram 200-*b* may illustrate aspects of maintenance operations being performed in parallel, which may mitigate undesirable latency that would otherwise be incurred due to performing the operations serially. Thus, the overall performance of the associated memory system may be improved.

In some cases, the memory system controller may be operable to transfer data to and from the NAND device 210, via the bus 205, during one or more maintenance operations (e.g., garbage collection operations, write-back flush operations, or the like). For example, during a maintenance operation, the memory system controller may move (e.g., transfer) data from a first block of the NAND device 210 to a second block of the NAND device 210. In some instances, the first block and the second block may be SLC blocks, MLC blocks, TLC blocks, QLC blocks, or a combination thereof.

In some cases, in order to move (e.g., transfer) the data, the memory system controller may transfer data (e.g., Read xFer) from the first memory block of the NAND device 210 to the memory system controller via the bus 205. For example, the memory system controller may receive one or more portions of the data, from the NAND device 210, via the bus 205. Similarly, the memory system controller may transfer (e.g., Write xFer) the to the second block of the NAND device 210 via the bus 205. For example, once one or more portions of the data are received by the memory controller, the memory system controller may transfer the portion of the data to the second block of the NAND device 210 (e.g., via the bus 205) for programming.

In some cases, data may be transferred over the bus 205 while one or more programming operations are being performed at the NAND device 210. For example, during a first duration 245, a data may be programmed (e.g., written) to a first block (e.g., block N) of the NAND device 210. Although not illustrated, the data may have been previously read from a block, transferred to the memory system controller via the bus 205, and transferred from the memory system controller to the block via the bus 205.

During a second duration 250, the memory system may initiate an auto suspend feature. In some instances, the auto suspend feature may be initiated based on the memory system (e.g., the memory system controller) receiving a command from a host system. In some examples, the auto suspend feature may be defined by a standard or specification, such as a Joint Electron Device Engineering Council (JEDEC) standard or an ONFI specification. The auto suspend feature may suspend (e.g., temporarily suspend, suspend during the second duration 250) the data from being programmed to the first block of the NAND device 210.

Additionally, or alternatively, during the second duration 250, at least a portion (e.g., a first portion, a first subset) of data may be read from a second block (e.g., block N+1) of the NAND device 210. In some instances, the second block may be a SLC, MLC, TLC, or QLC block. For example, if the maintenance operation is a write buffer (WB) flush operation, the second block may be a SLC block, whereas if the maintenance operation is a garbage collection operation, the second block may be a TLC block.

During a third duration 255, the first subset of data may be transferred to the memory system controller via the bus 205. In a parallel operation, the programming operation on the first block may resume. That is, the data being programmed to block N, which was suspended during the second duration 250, may resume during the third duration 255. Thus, during the third duration 255, the first subset of data may be transferred to the memory system controller via the bus 205 in parallel with the data being programmed to block N, which may reduce the latency of the maintenance operation(s).

During a fourth duration 260, the memory system may initiate an auto suspend feature (e.g., a second auto suspend feature, an auto suspend feature for a second time). In some instances, the auto suspend feature may be initiated based on the memory system (e.g., the memory system controller) receiving a command from a host system. As described herein, the auto suspend feature may be defined by a JEDEC standard or ONFI specification. The auto suspend feature may suspend (e.g., temporarily suspend, suspend during the fourth duration 260) the data from being programmed to the first block of the NAND device 210. Additionally, or alternatively, during the fourth duration 260, at least a portion (e.g., a second portion, a second subset) of data may be read from the second block (e.g., block N+1) of the NAND device 210.

During a fifth duration 265, the programming operation on the first block may resume. That is, the data being programmed to block N, which was suspended during the fourth duration 260, may resume during the fifth duration 265. During a parallel operation (e.g., during a duration 270 that at least partially overlaps with the fifth duration 265), the second subset of data may be transferred to the memory system controller via the bus 205.

Moreover, during a second parallel operation (e.g., during a duration 275 that at least partially overlaps with the fifth duration 265), the data may be transferred from the memory system controller to the second block (e.g., block N+1) of memory cells of the NAND device 210 via the bus 205. In some instances, due to one or more characteristics of the memory system, the data for block N+1 may be transferred as a single dataset, whereas in prior programming operations (e.g., for block N), the data may have been transferred as multiple datasets. In other instances (e.g., for programming block N+2, N+3, etc.), the associated data may be transferred in a single dataset. Thus, during the fifth duration 265, the second subset of data may be transferred to the memory system controller via the bus 205 and the data may be transferred to block N+1 in parallel with the data being programmed to block N, which may reduce the latency of the maintenance operation(s).

During a sixth duration 280, the programming operation on the second block (e.g., block N+1) may be performed. In some instances, the sixth duration may occur immediately after the fifth duration 265. That is, the programming operation on block N+1 may commence following (e.g., immediately following) the completion of the programming operation on block N. The operations used to program block N and block N+1, as illustrated in FIG. 2B, may be used to program subsequent blocks during one or more maintenance operations. By performing operations in parallel, as described herein, the memory system may mitigate undesirable latency that would otherwise be incurred due to performing the operations serially. Thus, the overall performance of the memory system may be improved.

Figure 3:
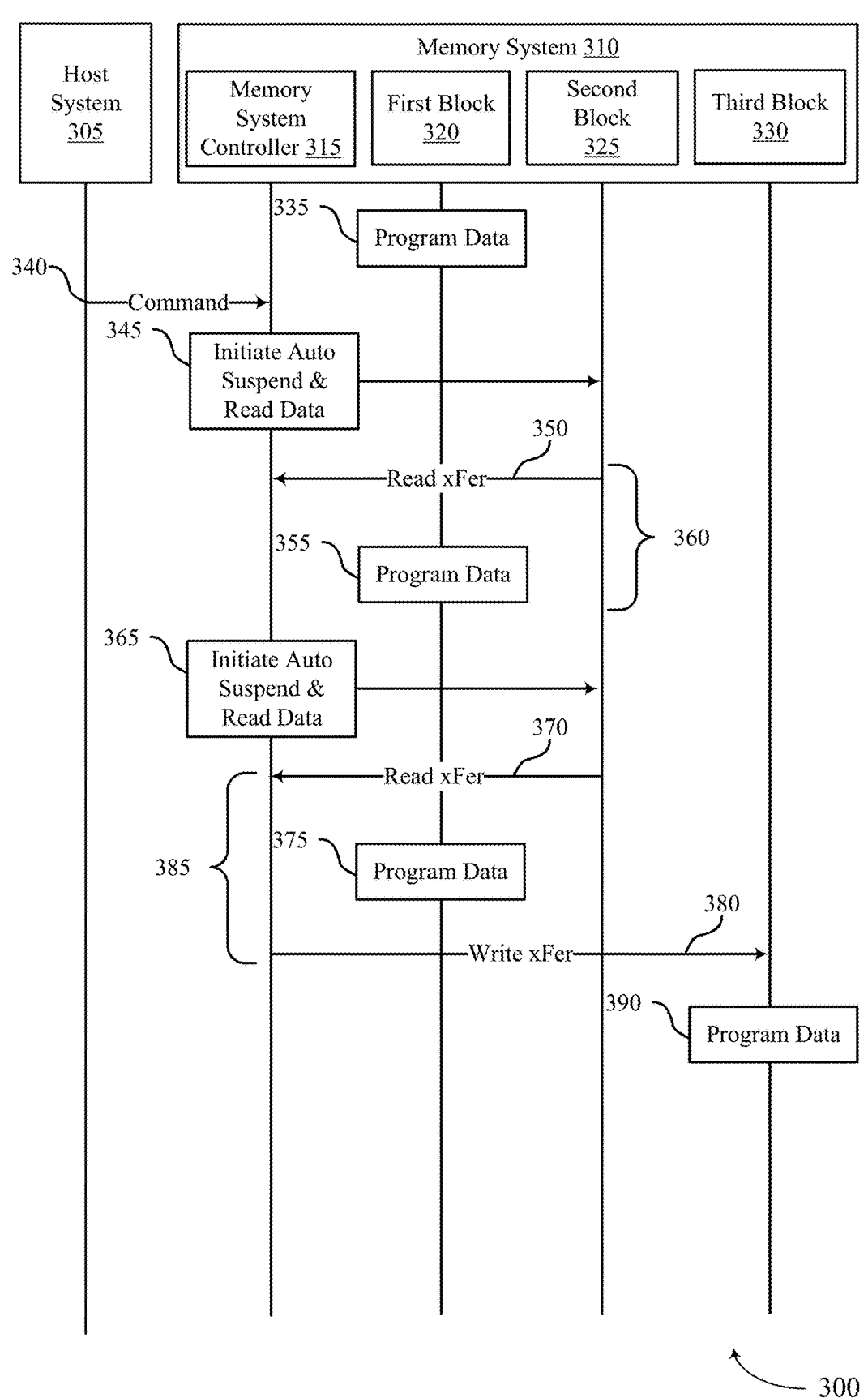
FIG. 3 shows an example of a process flow that supports data transfer during maintenance operations in accordance with examples as disclosed herein.

FIG. 3 shows an example of a process flow 300 that supports data transfer during maintenance operations in accordance with examples as disclosed herein. The process flow 300 may illustrate aspects or operations of the system 100 as described with reference to FIG. 1. For example, the process flow 300 may depict operations at a host system 305 and a memory system 310, which may be examples of a host system 105 and a memory system 110, respectively, as described with reference to FIG. 1. In accordance with operations as described herein, the memory system 310 may include a memory system controller 315, a first block 320, a second block 325, and a third block 330. The process flow 300 may illustrate aspects of maintenance operations being performed in parallel, which may mitigate undesirable latency that would otherwise be incurred due to performing the operations serially. Thus, the overall performance of the memory system 310 may be improved.

In the following description of the process flow 300, the methods, techniques, processes, and operations may be performed in different orders or at different times. Further, some operations may be left out of the process flow 300, or other operations may be added to the process flow 300.

At 335, data may be programmed (e.g., written) to the first block 320. In some examples, the data may have been previously read from another block and transferred to the memory system controller 315 during a duration (e.g., a seventh duration, not shown). As described herein, the first block 320 may be SLC block if the programming operation is associated with a WB flush, and may be a TLC block if the programming operation is associated with a garbage collection operation.

At 340, a command may be received by the memory system controller 315. In some instances, the command may be transmitted to the memory system controller 315 from the host system 305. The command may initiate an auto-suspend feature at the memory system 310.

At 345, the auto-suspend feature may be initiated and data may be read from the second block 325. In some instances, the memory system controller 315 may initiate the auto-suspend feature and read the data from the second block 325 based on receiving the command (e.g., at 340). As described herein, the auto-suspend feature may pause (e.g., suspend) the programming operation being performed on the first block 320 (e.g., at 335).

At 350, data may be transferred from the second block 325. In some examples, the data transferred may be a subset of a set of data stored to the second block 325. The data may be transferred to the memory system controller 315 via a bus (e.g., a bus 205 as described with reference to FIG. 2).

At 355, data may be programmed (e.g., written) to the first block 320. In some instances, the programming operation may resume on the first block 320 after being suspended (e.g., at 345). In some instances, the operations performed at 350 and 355 may occur in parallel (e.g., during a same duration) and thus may be collectively referred to as a single operation 360.

At 365, an auto-suspend feature (e.g., a second auto-suspend feature, an auto-suspend feature for a second time may be initiated and data may be read from the second block 325. In some instances, the memory system controller 315 may initiate the auto-suspend feature and read the data from the second block 325 based on receiving a second command (not shown). As described herein, the auto-suspend feature may pause (e.g., suspend) the programming operation being performed on the first block 320 (e.g., at 355).

At 370, data may be transferred from the second block 325. In some examples, the data transferred may be a subset (e.g., a second subset) of a set of data stored to the second block 325. The data may be transferred to the memory system controller 315 via a bus (e.g., a bus 205 as described with reference to FIG. 2).

At 375, data may be programmed (e.g., written) to the first block 320. In some instances, the programming operation may resume on the first block 320 after being suspended (e.g., at 365). In some instances, the programming operation may be completed at 375 (e.g., data may be fully programmed to the first block 320).

At 380, the data read from the second block 325 may be transferred to the third block 330. In some instances, the data may be transferred from the memory system controller 315 to the third block 330 via a bus. In some instances, the operations performed at 370, 375, and 380 may occur in parallel (e.g., during a same duration) and thus may be collectively referred to as a single operation 385.

At 390, data may be programmed (e.g., written) to the third block 330. In some examples, the data may be written to the third block 330 based on it being transferred from the memory system controller 315 (e.g., at 380). As described herein, the third block 330 may be SLC block if the programming operation is associated with a WB flush, and may be a TLC block if the programming operation is associated with a garbage collection operation. By performing operations in parallel, as described herein, the memory system 310 may mitigate undesirable latency that would otherwise be incurred due to performing the operations serially. Thus, the overall performance of the memory system 310 may be improved.

Figure 4:
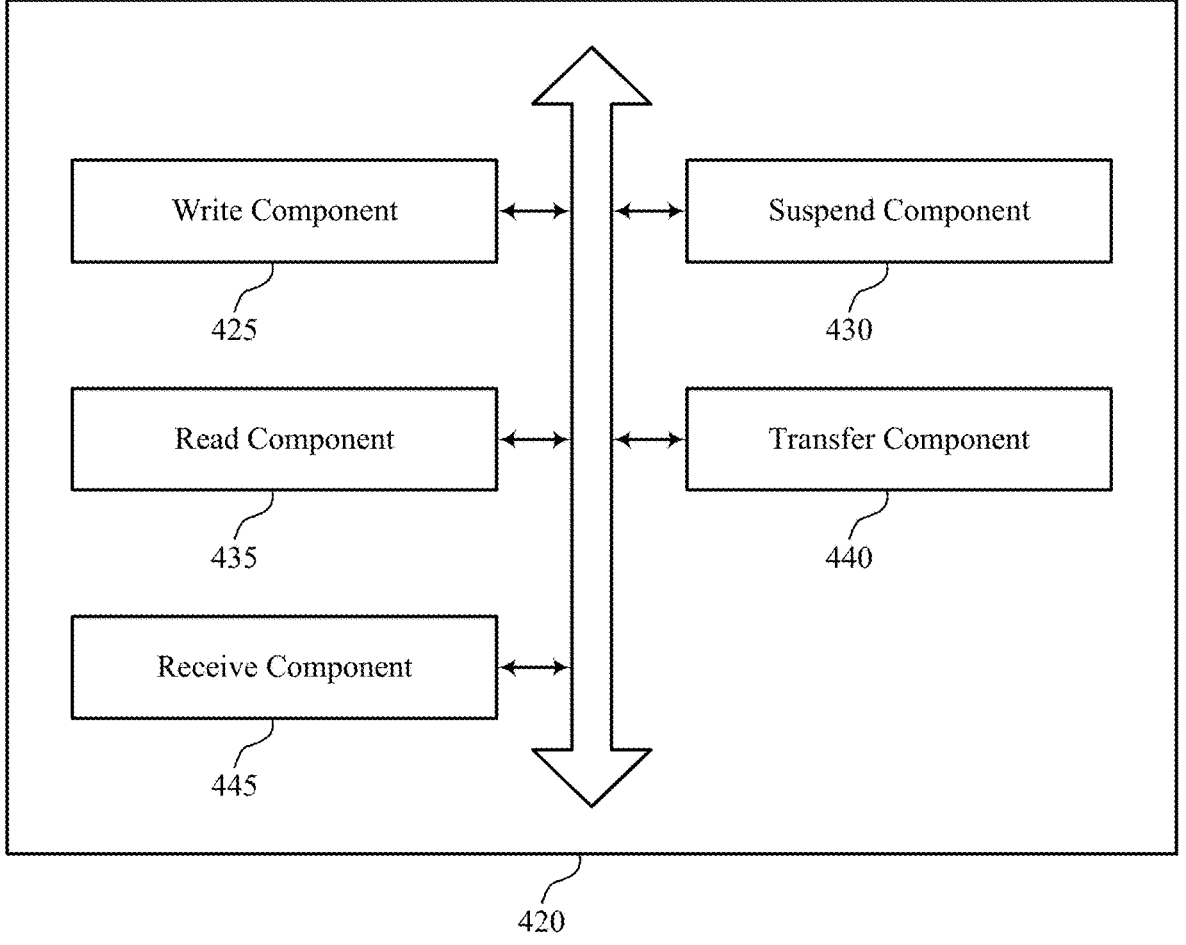
FIG. 4 shows a block diagram of a memory system that supports data transfer during maintenance operations in accordance with examples as disclosed herein.

FIG. 4 shows a block diagram 400 of a memory system 420 that supports data transfer during maintenance operations in accordance with examples as disclosed herein. The memory system 420 may be an example of aspects of a memory system as described with reference to FIGS. 1 through 5. The memory system 420, or various components thereof, may be an example of means for performing various aspects of data transfer during maintenance operations as described herein. For example, the memory system 420 may include a write component 425, a suspend component 430, a read component 435, a transfer component 440, a receive component 445, or any combination thereof. Each of these components may communicate, directly or indirectly, with one another (e.g., via one or more buses).

The write component 425 may be configured as or otherwise support a means for writing, during a first duration of a maintenance operation, a first subset of a first set of data to one or more multiple-level memory cells of a memory system. The suspend component 430 may be configured as or otherwise support a means for suspending, during a second duration of the maintenance operation, writing the first set of data to the one or more multiple-level memory cells of a memory system. The read component 435 may be configured as or otherwise support a means for reading, during the second duration, a first subset of a second set of data from one or more memory cells of the memory system. The transfer component 440 may be configured as or otherwise support a means for transferring, during a third duration of the maintenance operation, the first subset of the second set of data from the one or more memory cells to a controller of the memory system via a bus based at least in part on reading the first subset of the second set of data. In some examples, the write component 425 may be configured as or otherwise support a means for writing, during the third duration and concurrently with transferring the first subset of the second set of data, a second subset of the first set of data to the one or more multiple-level memory cells of the memory system.

In some examples, the suspend component 430 may be configured as or otherwise support a means for suspending, during a fourth duration of the maintenance operation, reading the second set of data from the one or more memory cells of the memory system and writing the second subset of the first set of data to the one or more multiple-level memory cells of the memory system. In some examples, the read component 435 may be configured as or otherwise support a means for reading, during the fourth duration of the maintenance operation, a second subset of the second set of data from the one or more memory cells of the memory system based at least in part on suspending reading the second set of data from the one or more memory cells of the memory system.

In some examples, the transfer component 440 may be configured as or otherwise support a means for transferring, during a fifth duration of the maintenance operation, a second subset of the second set of data from the one or more memory cells of the memory system to the controller via the bus based at least in part on reading the second subset of the second set of data. In some examples, the write component 425 may be configured as or otherwise support a means for writing, during the fifth duration and concurrently with transferring the second subset of the second set of data, a third subset of the first set of data to the one or more multiple-level memory cells of the memory system.

In some examples, the transfer component 440 may be configured as or otherwise support a means for transferring, during the fifth duration, the second set of data from the controller of the memory system to one or more multiple-level memory cells of the memory system via the bus based at least in part on transferring the second subset of the second set of data from the one or more memory cells to the controller via the bus.

In some examples, the write component 425 may be configured as or otherwise support a means for writing, during a sixth duration of the maintenance operation, the first subset of the second set of data to the one or more multiple-level memory cells of the memory system based at least in part on transferring the second set of data from the controller to the one or more multiple-level memory cells of the memory system via the bus.

In some examples, the second set of data is transferred from the controller to the one or more multiple-level memory cells concurrently with the third subset of the first set of data being written to the one or more multiple-level memory cells of the memory system.

In some examples, the first set of data includes the first subset, the second subset, and the third subset. In some examples, the second set of data includes the first subset and the second subset.

In some examples, the first subset of the second set of data is read from the one or more memory cells of the memory system while the second subset of the first set of data is being written to the one or more multiple-level memory cells of the memory system.

In some examples, the read component 435 may be configured as or otherwise support a means for reading, during a seventh duration of the maintenance operation that precedes the first duration, the first set of data from one or more memory cells of the memory system. In some examples, the transfer component 440 may be configured as or otherwise support a means for transferring, during the seventh duration, the first set of data from a controller of the memory system to the one or more multiple-level memory cells of the memory system based at least in part on reading the first set of data from the one or more memory cells, where writing the first subset of the first set of data is based at least in part on transferring the first set of data from the controller to the one or more multiple-level memory cells of the memory system.

In some examples, the receive component 445 may be configured as or otherwise support a means for receiving a command prior to the second duration of the maintenance operation, where suspending writing the first set of data to the one or more multiple-level memory cells and reading the first subset of the second set of data from the one or more memory cells of the memory system is based at least in part on receiving the command.

In some examples, the one or more memory cells of the memory system include single-level memory cells or triple-level memory cells.

FIG. 5 shows a flowchart illustrating a method 500 that supports data transfer during maintenance operations in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the wireless memory system may perform aspects of the described functions using special-purpose hardware.

At 505, the method may include writing, during a first duration of a maintenance operation, a first subset of a first set of data to one or more multiple-level memory cells of a memory system. The operations of 505 may be performed in accordance with examples as disclosed herein. In some examples, aspects of the operations of 505 may be performed by a write component 425 as described with reference to FIG. 4.

At 510, the method may include suspending, during a second duration of the maintenance operation, writing the first set of data to the one or more multiple-level memory cells of the memory system. The operations of 510 may be performed in accordance with examples as disclosed herein. In some examples, aspects of the operations of 510 may be performed by a suspend component 430 as described with reference to FIG. 4.

At 515, the method may include reading, during the second duration, a first subset of a second set of data from one or more memory cells of the memory system. The operations of 515 may be performed in accordance with examples as disclosed herein. In some examples, aspects of the operations of 515 may be performed by a read component 435 as described with reference to FIG. 4.

At 520, the method may include transferring, during a third duration of the maintenance operation, the first subset of the second set of data from the one or more memory cells to a controller of the memory system via a bus based at least in part on reading the first subset of the second set of data. The operations of 520 may be performed in accordance with examples as disclosed herein. In some examples, aspects of the operations of 520 may be performed by a transfer component 440 as described with reference to FIG. 4.

At 525, the method may include writing, during the third duration and concurrently with transferring the first subset of the second set of data, a second subset of the first set of data to the one or more multiple-level memory cells of the memory system. The operations of 525 may be performed in accordance with examples as disclosed herein. In some examples, aspects of the operations of 525 may be performed by a write component 425 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing, during a first duration of a maintenance operation, a first subset of a first set of data to one or more multiple-level memory cells of a memory system; suspending, during a second duration of the maintenance operation, writing the first set of data to the one or more multiple-level memory cells of the memory system; reading, during the second duration, a first subset of a second set of data from one or more memory cells of the memory system; transferring, during a third duration of the maintenance operation, the first subset of the second set of data from the one or more memory cells to a controller of the memory system via a bus based at least in part on reading the first subset of the second set of data; and writing, during the third duration and concurrently with transferring the first subset of the second set of data, a second subset of the first set of data to the one or more multiple-level memory cells of the memory system.

Aspect 2: The method, apparatus, or non-transitory computer-readable medium of aspect 1, further including operations, features, circuitry, logic, means, or instructions, or any combination thereof for suspending, during a fourth duration of the maintenance operation, reading the second set of data from the one or more memory cells of the memory system and writing the second subset of the first set of data to the one or more multiple-level memory cells of the memory system and reading, during the fourth duration of the maintenance operation, a second subset of the second set of data from the one or more memory cells of the memory system based at least in part on suspending reading the second set of data from the one or more memory cells of the memory system.

Aspect 3: The method, apparatus, or non-transitory computer-readable medium of aspect 2, further including operations, features, circuitry, logic, means, or instructions, or any combination thereof for transferring, during a fifth duration of the maintenance operation, a second subset of the second set of data from the one or more memory cells of the memory system to the controller via the bus based at least in part on reading the second subset of the second set of data and writing, during the fifth duration and concurrently with transferring the second subset of the second set of data, a third subset of the first set of data to the one or more multiple-level memory cells of the memory system.

Aspect 4: The method, apparatus, or non-transitory computer-readable medium of aspect 3, further including operations, features, circuitry, logic, means, or instructions, or any combination thereof for transferring, during the fifth duration, the second set of data from the controller of the memory system to one or more multiple-level memory cells of the memory system via the bus based at least in part on transferring the second subset of the second set of data from the one or more memory cells to the controller via the bus.

Aspect 5: The method, apparatus, or non-transitory computer-readable medium of aspect 4, further including operations, features, circuitry, logic, means, or instructions, or any combination thereof for writing, during a sixth duration of the maintenance operation, the first subset of the second set of data to the one or more multiple-level memory cells of the memory system based at least in part on transferring the second set of data from the controller to the one or more multiple-level memory cells of the memory system via the bus.

Aspect 6: The method, apparatus, or non-transitory computer-readable medium of any of aspects 4 through 5, where the second set of data is transferred from the controller to the one or more multiple-level memory cells concurrently with the third subset of the first set of data being written to the one or more multiple-level memory cells of the memory system.

Aspect 7: The method, apparatus, or non-transitory computer-readable medium of any of aspects 3 through 6, where the first set of data includes the first subset, the second subset, and the third subset and the second set of data includes the first subset and the second subset.

Aspect 8: The method, apparatus, or non-transitory computer-readable medium of any of aspects 1 through 7, where the first subset of the second set of data is read from the one or more memory cells of the memory system while the second subset of the first set of data is being written to the one or more multiple-level memory cells of the memory system.

Aspect 9: The method, apparatus, or non-transitory computer-readable medium of any of aspects 1 through 8, further including operations, features, circuitry, logic, means, or instructions, or any combination thereof for reading, during a seventh duration of the maintenance operation that precedes the first duration, the first set of data from one or more memory cells of the memory system and transferring, during the seventh duration, the first set of data from a controller of the memory system to the one or more multiple-level memory cells of the memory system based at least in part on reading the first set of data from the one or more memory cells, where writing the first subset of the first set of data is based at least in part on transferring the first set of data from the controller to the one or more multiple-level memory cells of the memory system.

Aspect 10: The method, apparatus, or non-transitory computer-readable medium of any of aspects 1 through 9, further including operations, features, circuitry, logic, means, or instructions, or any combination thereof for receiving a command prior to the second duration of the maintenance operation, where suspending writing the first set of data to the one or more multiple-level memory cells and reading the first subset of the second set of data from the one or more memory cells of the memory system is based at least in part on receiving the command.

Aspect 11: The method, apparatus, or non-transitory computer-readable medium of any of aspects 1 through 10, where the one or more memory cells of the memory system include single-level memory cells or triple-level memory cells.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
   write, during a first duration of a maintenance operation, a first subset of a first set of data to one or more multiple-level memory cells of the memory device;
   suspend, during a second duration of the maintenance operation that is after the first duration, writing the first set of data to the one or more multiple-level memory cells of the memory device;
   read, during the second duration, a first subset of a second set of data from one or more memory cells of the memory device;
   transfer, during a third duration of the maintenance operation that is after the second duration, the first subset of the second set of data from the one or more multiple-level memory cells to the controller via a bus based at least in part on reading the first subset of the second set of data; and
   write, during the third duration and concurrently with transferring the first subset of the second set of data, a second subset of the first set of data to the one or more multiple-level memory cells of the memory device.

2. The apparatus of claim 1, wherein the controller is further configured to cause the apparatus to:
   suspend, during a fourth duration of the maintenance operation, reading the second set of data from the one or more memory cells of the memory device and writing the second subset of the first set of data to the one or more multiple-level memory cells of the memory device; and
   read, during the fourth duration of the maintenance operation, a second subset of the second set of data from the one or more memory cells of the memory device based at least in part on suspending reading the second set of data from the one or more memory cells of the memory device.

3. The apparatus of claim 2, wherein the controller is further configured to cause the apparatus to:
   transfer, during a fifth duration of the maintenance operation, a second subset of the second set of data from the one or more memory cells of the memory device to the controller via the bus based at least in part on reading the second subset of the second set of data; and
   write, during the fifth duration and concurrently with transferring the second subset of the second set of data, a third subset of the first set of data to the one or more multiple-level memory cells of the memory device.

4. The apparatus of claim 3, wherein the controller is further configured to cause the apparatus to transfer, during the fifth duration, the second set of data from the controller of the memory device to the one or more multiple-level memory cells of the memory device via the bus based at least in part on transferring the second subset of the second set of data from the one or more memory cells to the controller via the bus.

5. The apparatus of claim 4, wherein the controller is further configured to cause the apparatus to write, during a sixth duration of the maintenance operation, the first subset of the second set of data to the one or more multiple-level memory cells of the memory device based at least in part on transferring the second set of data from the controller to the one or more multiple-level memory cells of the memory device via the bus.

6. The apparatus of claim 4, wherein the second set of data is transferred from the controller to the one or more multiple-level memory cells concurrently with the third subset of the first set of data being written to the one or more multiple-level memory cells of the memory device.

7. The apparatus of claim 3, wherein:

the first set of data comprises the first subset, the second subset, and the third subset, and the second set of data comprises the first subset and the second subset.

8. The apparatus of claim 1, wherein the first subset of the second set of data is read from the one or more memory cells of the memory device while the second subset of the first set of data is being written to the one or more multiple-level memory cells of the memory device.

9. The apparatus of claim 1, wherein the controller is further configured to cause the apparatus to:

read, during a seventh duration of the maintenance operation that precedes the first duration, the first set of data from the one or more memory cells of the memory device; and transfer, during the seventh duration, the first set of data from the controller to the one or more multiple-level memory cells of the memory device based at least in part on reading the first set of data from the one or more memory cells, wherein writing the first subset of the first set of data is based at least in part on transferring the first set of data from the controller to the one or more multiple-level memory cells of the memory device.

10. The apparatus of claim 1, wherein the controller is further configured to cause the apparatus to receive a command prior to the second duration of the maintenance operation, wherein suspending writing the first set of data to the one or more multiple-level memory cells and reading the first subset of the second set of data from the one or more memory cells of the memory device is based at least in part on receiving the command.

11. The apparatus of claim 1, wherein the one or more memory cells of the memory device comprise single-level memory cells or triple-level memory cells.

12. A non-transitory computer-readable medium storing code comprising instructions which, when executed by a processor of an electronic device, cause the electronic device to:

write, during a first duration of a maintenance operation, a first subset of a first set of data to one or more multiple-level memory cells of a memory system;

suspend, during a second duration of the maintenance operation that is after the first duration, writing the first set of data to the one or more multiple-level memory cells of the memory system;

read, during the second duration, a first subset of a second set of data from one or more memory cells of the memory system;

transfer, during a third duration of the maintenance operation that is after the second duration, the first subset of the second set of data from the one or more multiple-level memory cells to a controller of the memory system via a bus based at least in part on reading the first subset of the second set of data; and write, during the third duration and concurrently with transferring the first subset of the second set of data, a second subset of the first set of data to the one or more multiple-level memory cells of the memory system.

13. The non-transitory computer-readable medium of claim 12, wherein the instructions, when executed by the processor of the electronic device, further cause the electronic device to:

suspend, during a fourth duration of the maintenance operation, reading the second set of data from the one or more memory cells of the memory system and writing the second subset of the first set of data to the one or more multiple-level memory cells of the memory system; and read, during the fourth duration of the maintenance operation, a second subset of the second set of data from the one or more memory cells of the memory system based at least in part on suspending reading the second set of data from the one or more memory cells of the memory system.

14. The non-transitory computer-readable medium of claim 13, wherein the instructions, when executed by the processor of the electronic device, further cause the electronic device to:

transfer, during a fifth duration of the maintenance operation, a second subset of the second set of data from the one or more memory cells of the memory system to the controller via the bus based at least in part on reading the second subset of the second set of data; and write, during the fifth duration and concurrently with transferring the second subset of the second set of data, a third subset of the first set of data to the one or more multiple-level memory cells of the memory system.

15. The non-transitory computer-readable medium of claim 14, wherein the instructions, when executed by the processor of the electronic device, further cause the electronic device to:

transfer, during the fifth duration, the second set of data from the controller of the memory system to the one or more multiple-level memory cells of the memory system via the bus based at least in part on transferring the second subset of the second set of data from the one or more memory cells to the controller via the bus.

16. The non-transitory computer-readable medium of claim 15, wherein the instructions, when executed by the processor of the electronic device, further cause the electronic device to:

write, during a sixth duration of the maintenance operation, the first subset of the second set of data to the one or more multiple-level memory cells of the memory system based at least in part on transferring the second set of data from the controller to the one or more multiple-level memory cells of the memory system via the bus.

17. The non-transitory computer-readable medium of claim 15, wherein the second set of data is transferred from the controller to the one or more multiple-level memory cells concurrently with the third subset of the first set of data being written to the one or more multiple-level memory cells of the memory system.

18. The non-transitory computer-readable medium of claim 12, wherein the first subset of the second set of data is read from the one or more memory cells of the memory system while the second subset of the first set of data is being written to the one or more multiple-level memory cells of the memory system.

19. The non-transitory computer-readable medium of claim 12, wherein the instructions, when executed by the processor of the electronic device, further cause the electronic device to:

read, during a seventh duration of the maintenance operation that precedes the first duration, the first set of data from the one or more memory cells of the memory system; and transfer, during the seventh duration, the first set of data from the controller of the memory system to the one or more multiple-level memory cells of the memory system based at least in part on reading the first set of data from the one or more memory cells, wherein writing the first subset of the first set of data is based at least in part on transferring the first set of data from the controller to the one or more multiple-level memory cells of the memory system.

20. A method, comprising:

writing, during a first duration of a maintenance operation, a first subset of a first set of data to one or more multiple-level memory cells of a memory system;

24 suspending, during a second duration of the maintenance operation that is after the first duration, writing the first set of data to the one or more multiple-level memory cells of the memory system;

reading, during the second duration, a first subset of a second set of data from one or more memory cells of the memory system;

transferring, during a third duration of the maintenance operation that is after the second duration, the first subset of the second set of data from the one or more multiple-level memory cells to a controller of the memory system via a bus based at least in part on reading the first subset of the second set of data; and writing, during the third duration and concurrently with transferring the first subset of the second set of data, a second subset of the first set of data to the one or more multiple-level memory cells of the memory system.

* * * * *